B. HOLT.
TRACTOR TRUCK MECHANISM.
APPLICATION FILED DEC. 11, 1916.
1,258,607.
Patented Mar. 5, 1918.
2 SHEETS—SHEET 2.
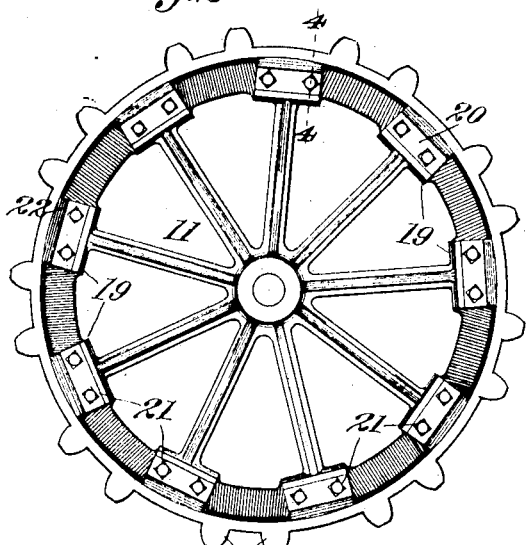
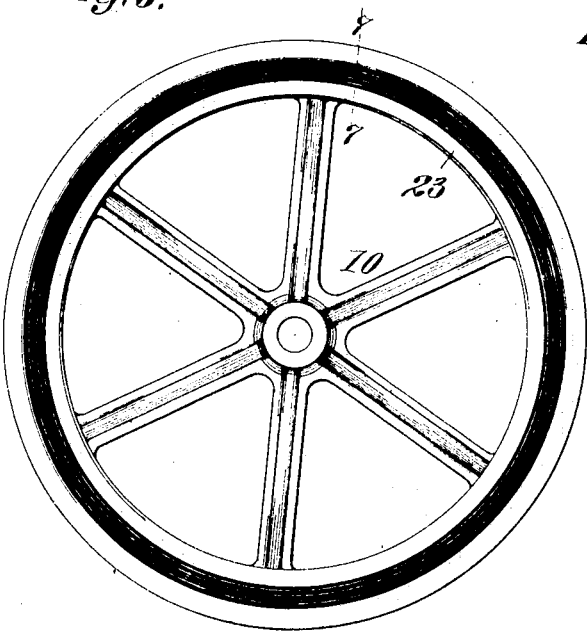
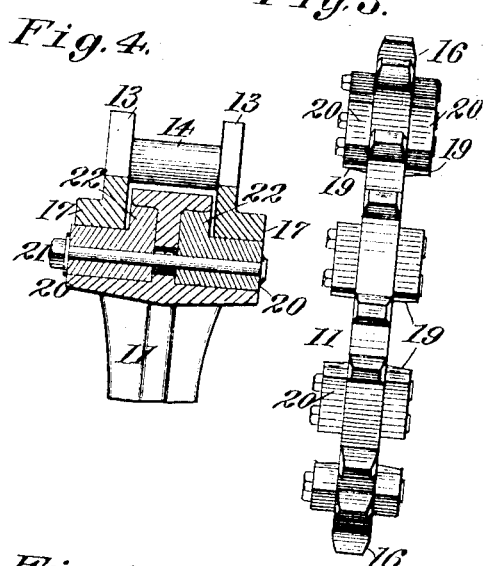
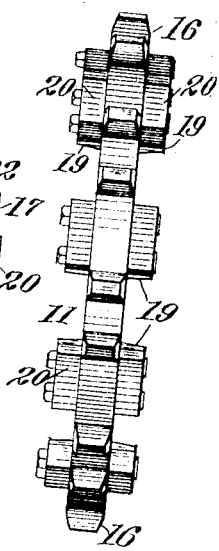
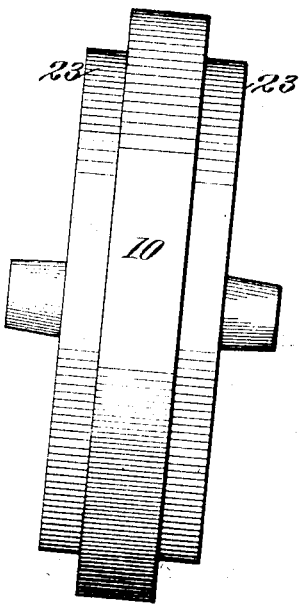
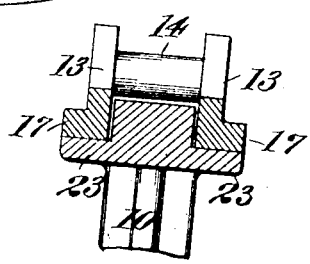
WITNESSES:
Charles Pickles
Frances V. Cole
INVENTOR
Benjamin Holt
BY Strong & Townsend
ATTORNEY

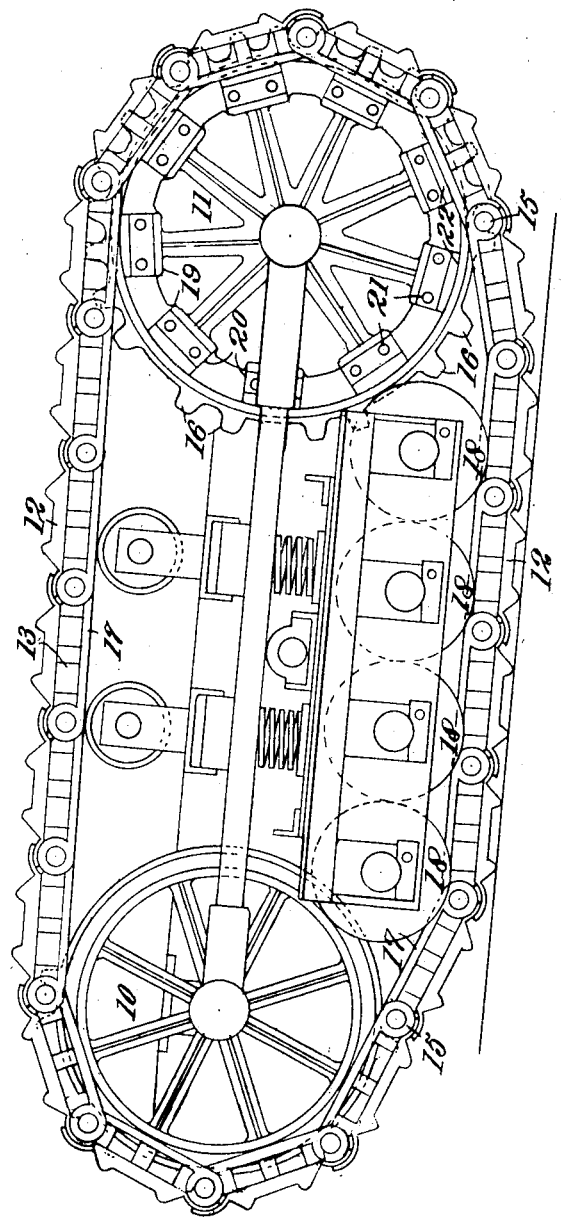

UNITED STATES PATENT OFFICE.

BENJAMIN HOLT, OF STOCKTON, CALIFORNIA.

TRACTOR-TRUCK MECHANISM.

1,258,607.

Specification of Letters Patent.  Patented Mar. 5, 1918.

Application filed December 11, 1916. Serial No. 136,221.

*To all whom it may concern:*

Be it known that I, BENJAMIN HOLT, a citizen of the United States, residing at Stockton, in the county of San Joaquin and State of California, have invented new and useful Improvements in Tractor-Truck Mechanism, of which the following is a specification.

This invention relates to guide and drive wheels for endless chain tracks, such as used in tractors of the self-laying track type; and has for its object to provide for a better and more even distribution of the wear upon the sprocket teeth of the track and wheels.

This object I accomplish by the provision of flanges on the sides of the wheel fellies to receive and support the rail heads of the track links in such position as to relieve a great portion of the wear upon the teeth and periphery of the wheels and pin teeth of the track links.

In the accompanying drawings:

Figure 1 shows a side elevation of a tractor truck mechanism embodying my invention.

Fig. 2 shows a side elevation of the sprocket driving wheel employed therein.

Fig. 3 shows an edge view of the same.

Fig. 4 shows a sectional view, taken on the line 4—4 of Fig. 2.

Fig. 5 shows a circumferential view of the blank rim guide wheel employed in the tractor truck mechanism.

Fig. 6 shows an edge view of the same.

Fig. 7 shows a sectional view on the line 7—7 of Fig. 5.

The tractor truck mechanism shown herein includes a front blank rim guide wheel 10 and a rear toothed rim drive wheel 11, over which operates an endless chain track 12. The track is made up of a series of articulated link sections, each comprising spaced side plates 13, connected together at one end by a sleeve or gudgeon block 14, cored to receive a journal pin 15 for connecting adjacent links together, said sleeves or gudgeon blocks forming also pin teeth to engage with the sprocket teeth 16 on the wheel 11. The side bars 13 have rail heads 17 on their inner longitudinal edges, forming a continuous track for supporting a series of rollers 18, the latter carrying the weight of the tractor or vehicle frame. The side bars 13 of the link sections straddle the rims of the wheels 10 and 11 for the purpose of better guidance. Consequently the rims and teeth of these wheels are made comparatively narrow, and in prior constructions the entire wear between the track and wheels falls upon the sprocket teeth and rims of the wheels and upon the sleeves or pin teeth of the chain track.

In order to increase the wearing surface between the wheels and track and relieve the parts mentioned of considerable of the wear, I provide the wheels 10 and 11 with laterally projecting flanges upon which the rail heads 17 of the links rest when the said links are in engagement with the teeth of the driving wheel or passing around the rim of the blank guide wheel.

Two forms of flanges are shown, one in Figs. 2 to 4, applicable to the toothed driving wheel, and one in Figs. 5 to 7, applied to the blank rim guide wheel. The former consists of interrupted flanges 19 cast on opposite sides of the felly of the wheel and receiving removable blocks 20 secured in place by bolts 21 extending through the felly of the wheel, said blocks 20 being provided with vertical extensions 22 lying beneath the protruding rim of the wheel. The removable blocks 20 have an advantage in that they permit easy replacement in case of early wear and also in allowing material different from the wheel to be used therein. For some purposes material other than metal might be desired, such as fiber, or even rubber, for absorbing the shocks and eliminating the noises.

It will be noted that the flanges 19 are located between the teeth 16 so that they will serve to engage and support the link sections intermediately, thereby bridging the space between the opposite ends of the links, which ends rest upon and are supported by the teeth and rim of the wheel by means of the transverse pins or sleeves 14.

The second form of flange shown consists of a continuous laterally projecting ring 23, on opposite side of the felly of the wheel 10 and cast integral therewith. As indicated in Figs. 4 and 7, the position of the flanges may be such that the links are supported in place thereon with their pin teeth 14 slightly raised from the base of the sprocket teeth 16 on the wheel 11 or from the periphery of the blank rim on the wheel 10, so that all of the radial pressure on the wheels is taken up by the flanges 19 and 23. Thus the teeth of the track and drive wheel are relieved of all strains except the circumferential stresses necessary for driving.

Various changes in the construction and arrangement of the several parts herein shown and described may be employed without departing from the spirit of my invention as disclosed in the appended claims.

Having thus described my invention, what I claim and desire to secure by Letters Patent is—

1. A wheel for tractor truck mechanisms over which an endless chain track operates, said wheel having a narrow rim adapted to be straddled by the links of the chain track, and flange segments formed at spaced intervals on the felly of the wheel to receive and support the link sections at their inner longitudinal edges.

2. In a tractor truck mechanism, an endless chain track made up of a series of articulated link sections having side bars, and a wheel over which said track operates, said wheel having its rim straddled by the side bars of the link sections, and flange segments formed at spaced intervals on opposite sides of the felly of the wheel to receive and support the inner longitudinal edges of the side bars.

3. In a tractor truck mechanism, an endless chain track made up of a series of articulated link sections having side bars and a wheel over which said track operates, said wheel having its rim straddled by the side bars of the link sections, and removable flange segments secured to opposite sides of the felly of the wheel to receive and support the inner longitudinal edges of the side bars.

4. A toothed driving wheel for tractor truck mechanisms over which an endless, self-laying rail track is adapted to operate, said wheel having a rim and teeth projecting between the rails of the track, and spaced flange segments formed on opposite sides of the felly and the wheel and so positioned relatively to the sprocket teeth as to register with the central portion of the links of the track.

5. In a tractor truck mechanism, an endless chain track made up of a series of articulated link sections having side bars and a wheel over which said track operates, said wheel having its rim straddled by the side bars of the link sections, flange segments formed at spaced intervals on opposite sides of the felly of the wheel, and removable contact members secured on said flanges to receive and support the links of the track at points intermediate of the connections between said links.

6. A toothed driving wheel for tractor truck mechanisms, over which an endless, self-laying rail track is adapted to operate, said wheel having a rim and teeth projecting between the rails of the tracks, spaced flange segments formed on opposite sides of the felly and the wheel and so positioned relatively to the sprocket teeth as to register with the central portion of the links of the track, and removable contact members secured on said flanges to receive and support the links of the track at points intermediate of the connections between said links.

In testimony whereof I have hereunto set my hand in the presence of two subscribing witnesses.

BENJAMIN HOLT.

Witnesses:
DAN N. GILMORE,
C. L. NEUMILLER.